US007091836B2

(12) United States Patent
Kachouh et al.

(10) Patent No.: US 7,091,836 B2

(45) Date of Patent: Aug. 15, 2006

(54) MOTOR VEHICLE DOOR LOCKING SYSTEM AND DOOR HANDLE

(75) Inventors: Checrallah Kachouh, Dortmund (DE); Ingmar Hentsch, Wuppertal (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 148 days.

(21) Appl. No.: 10/933,511

(22) Filed: Sep. 3, 2004

(65) Prior Publication Data

US 2005/0057047 A1 Mar. 17, 2005

(30) Foreign Application Priority Data

Sep. 5, 2003 (DE) ................................ 103 41 402

(51) Int. Cl.
*B60R 25/10* (2006.01)

(52) U.S. Cl. ................................ 340/426.28; 307/10.1

(58) Field of Classification Search ........... 340/426.28, 340/425.5, 542; 70/239; 307/9.1, 10.1; 200/81 H See application file for complete search history.

(56) References Cited

U.S. PATENT DOCUMENTS

| | | | | |
|---|---|---|---|---|
| 5,682,135 | A * | 10/1997 | Labonde | 340/426.17 |
| 6,075,294 | A * | 6/2000 | Van den Boom et al. | 307/10.1 |
| 6,247,343 | B1 | 6/2001 | Weiss et al. | |
| 6,518,883 | B1 * | 2/2003 | Benard et al. | 340/542 |
| 6,527,316 | B1 * | 3/2003 | Agostini et al. | 292/347 |
| 6,768,413 | B1 * | 7/2004 | Kemmann et al. | 340/5.72 |
| 6,879,058 | B1 * | 4/2005 | Lorenz et al. | 307/10.1 |
| 6,924,735 | B1 * | 8/2005 | Ueda et al. | 340/426.28 |
| 6,998,968 | B1 * | 2/2006 | Garnault et al. | 340/426.28 |

* cited by examiner

*Primary Examiner*—John Tweel, Jr.

(74) *Attorney, Agent, or Firm*—David S. Safran

(57) ABSTRACT

A motor vehicle door locking system and a door handle are proposed. In order to prevent unlocking or opening of an electrically triggered motor vehicle door lock by unintentional actuation of a first actuating means, a second actuating means is employed and required to be activated in combination with the first actuation means for unlocking or opening of the motor vehicle door lock, and thus unlocking or opening the assigned motor vehicle.

40 Claims, 4 Drawing Sheets

MOTOR VEHICLE DOOR LOCKING SYSTEM AND DOOR HANDLE

BACKGROUND OF THE INVENTION

1. Field of the Invention

This invention relates to a motor vehicle door locking system and a door handle for a motor vehicle door.

2. Description of Related Art

In motor vehicle door locking systems to date, the inside door handle is usually mechanically connected to an assigned motor vehicle door lock. When the inside door handle is pulled, the door is unlatched for opening. As result of the inertia and/or sluggishness of the mechanism, unintentional opening of the assigned motor vehicle door is unlikely.

The use of an electric lock as a motor vehicle door lock with a pushbutton for electrical triggering and unlocking or opening has also been proposed. However, when compared with mechanical triggering, there is a much higher risk that unwanted actuation of the pushbutton or some other electrical actuating means will lead to unintentional opening of the assigned motor vehicle door.

SUMMARY OF THE INVENTION

An object of the present invention is to devise a motor vehicle door locking system and a door handle, particularly an inside door handle, in which unwanted opening of an associated motor vehicle door, when using an electrically triggered motor vehicle door lock (i.e., an electric lock), can be avoided.

Another object of this invention is to provide a second actuating means in addition to a first actuating means, such as a pushbutton or sensor, for electrical triggering of the motor vehicle door lock. Unlocking and/or opening of the assigned motor vehicle door lock is enabled only with simultaneous or successive actuation of the first and second actuating means. In this way, unwanted actuation of the first actuating means is prevented from leading to unintentional unlocking and/or opening of the motor vehicle door lock and thus of the assigned motor vehicle door.

According to one preferred embodiment, the two actuating means are located on different sides of an inside door handle which face away from one another so that different hand areas and/or fingers have to be used to actuate the two actuating means. Consequently, unintentional actuation of one of the two actuating means which point for example toward the interior of the motor vehicle, for example, by an arm or a leg of a vehicle passenger, does not lead to unwanted unlocking and/or opening of the assigned motor vehicle door lock since prior or simultaneous actuation of the other actuating means has not taken place.

According to another preferred embodiment, the actuating means are made and/or arranged such that it is necessary to reach around the inside door handle for actuation and thus for unlocking and opening the assigned motor vehicle door lock. This ensures that the operator, upon unlocking or opening of the motor vehicle door, holds the inside door handle in his hand and consequently is prepared for possible opening of the motor vehicle door.

Depending on the configuration, the second actuating means can also act such that only by its actuation is the first actuating means unblocked, and this can take place mechanically and/or electrically.

The term "actuation" in this invention should be understood first of all in a first sense as the mechanical action of an operator or a vehicle passenger (for example, with a hand or a finger) on a pushbutton, switch or the like or deformation of the handle section by the operator. But in a another sense, "actuation" is also defined as the approach, for example, to a sensor or a door handle and/or the touching of the door handle section or the like, in which the approach or touching can be detected and can be evaluated as an actuation.

It should be pointed out that the proposed inventive approach can also be used in an outside door handle or in other manipulation elements, which acquires independent importance and according to which a door handle as such is claimed. This door handle can accordingly be made as an inside door handle, an outside door handle, or as some other manipulation element.

The use of the proposed inventive approach in a motor vehicle door locking system with a passive entry function for unlocking of the motor vehicle door lock from the outside leads to additional advantages. The unlocking of the motor vehicle door lock begins, in this system, with a starting interval in order to activate the system when the operator approaches. This is followed by an authentication check interval to check the operator for authorization. For this purpose, the operator, for example, carries a remote control module with which the corresponding signals can be exchanged. Finally, the actual action interval follows, in which the motor vehicle door lock is unlocked. After completion of the action interval, the motor vehicle door lock can be opened.

According to another especially exemplary embodiment, one of the actuating means is used to start the above described starting interval. For this purpose, this actuating means can be made as a proximity switch. Subsequent actuation of the other actuating means then leads to the motor vehicle door lock being opened if the action interval, therefore unlocking, is completed. Here too, it is basically such that the opening of the motor vehicle door lock is only enabled with simultaneous or successive actuation of the two actuating means. Operation with two actuating means makes it possible to avoid waiting times for the operator during the starting interval, the authentication check interval, and the action interval. This applies especially when the actuating means which starts the starting interval is made as a proximity switch.

Other advantages, features, properties and aspects of this invention arise from the following description of one preferred embodiment using the drawings.

DETAILED DESCRIPTION OF THE INVENTION

In the figures, the same reference numbers are used for the same or similar parts, the corresponding or comparable properties and advantages being achieved, even if a repeated description is omitted.

Figure 1:
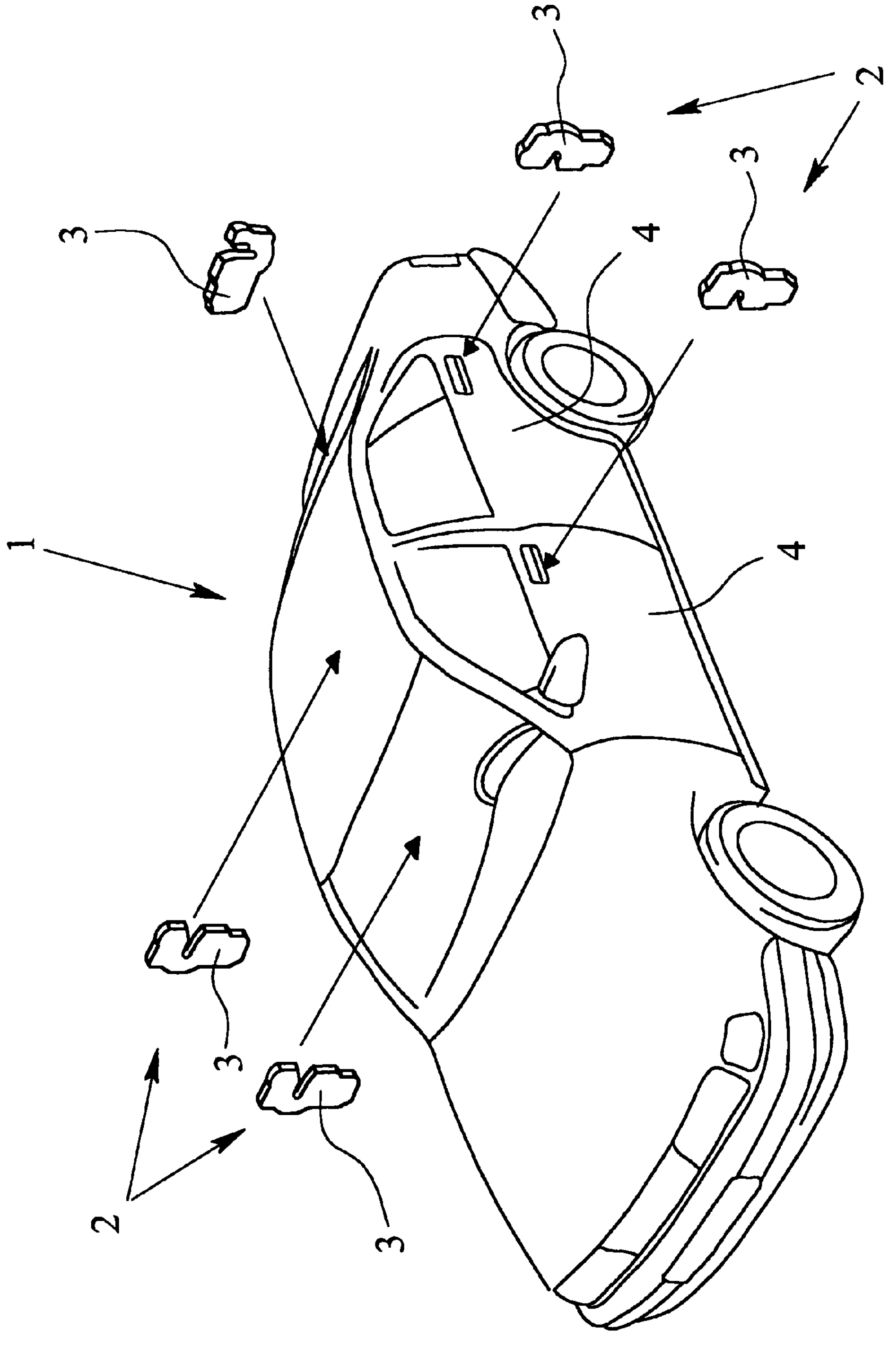
FIG. 1 shows a schematic perspective of a motor vehicle with several motor vehicle door locks.

FIG. 1 schematically shows a motor vehicle 1 with a motor vehicle door locking system 2 which is only partially indicated, and which has several motor vehicle door locks 3, preferably for motor vehicle side doors 4, a motor vehicle rear hatch or the like. The installation position of the motor vehicle door locks 3 is schematically shown in FIG. 1 by arrows.

Figure 2:
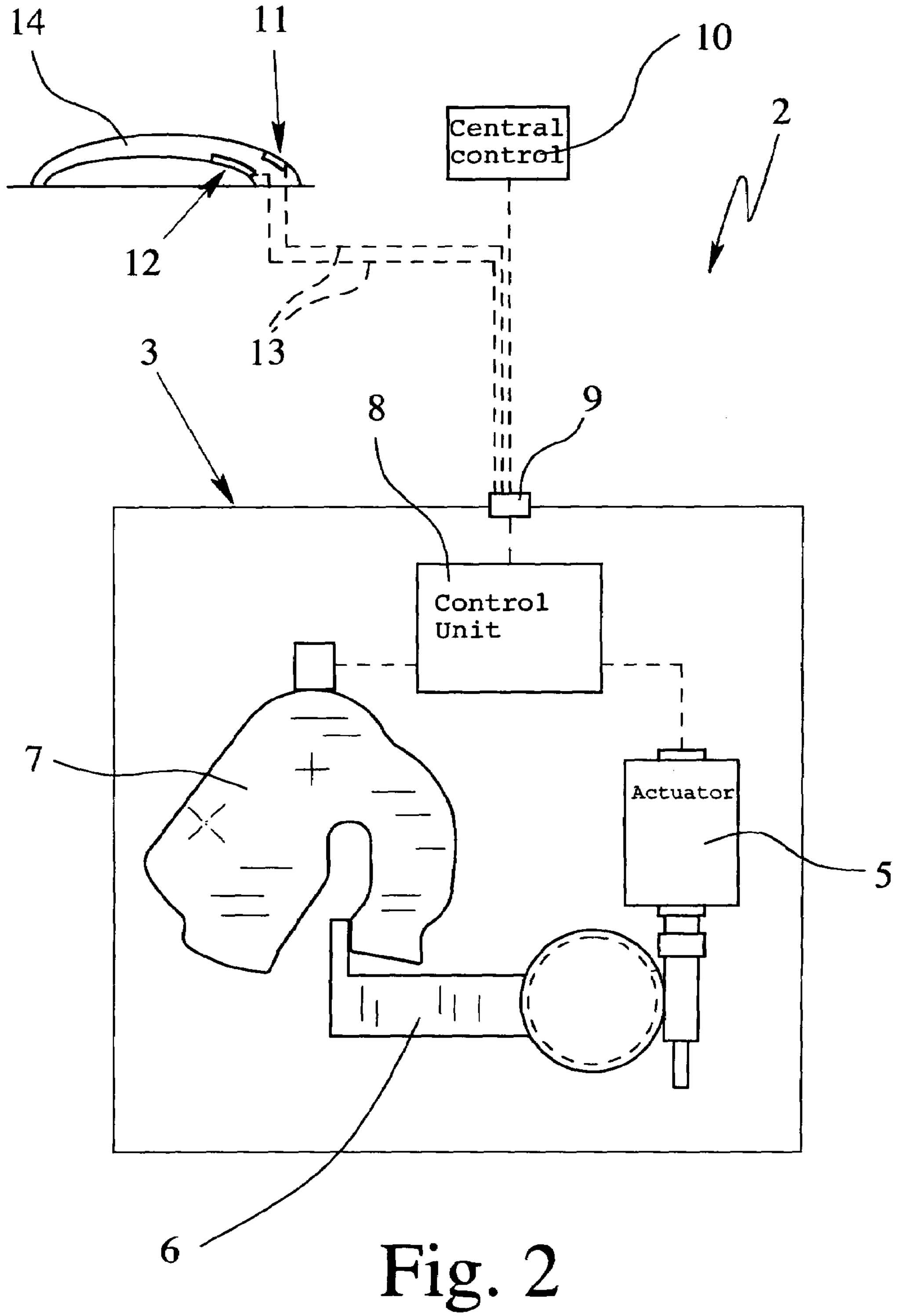
FIG. 2 shows a schematic perspective of a motor vehicle door locking system in accordance with the invention.

Preferably, each motor vehicle door lock 3 can be unlocked, locked and/or opened by a motor (e.g., an electric motor) as is shown in the schematic of the door locking system 2 as claimed in the invention as shown in FIG. 2. The motor vehicle door lock 3 in the illustrated example has an actuator or a drive 5 which acts on a conventional lock mechanism (here a ratchet 6), which is used as a safeguard with respect to associated latch 7 of the motor vehicle door lock 3. It goes without saying that other types of lock mechanisms can also be used here.

The actuator 5 can be embodied by an electric motor. However, the actuator 5 can also act or can be actuated pneumatically or hydraulically. In any case, the motor vehicle door lock 3 is or can preferably be electrically triggered. The motor vehicle door lock 3 has a control unit 8 for controlling or triggering the actuator 5 and/or for detecting, as well as evaluating the actuating signals. The motor vehicle door lock 3 or its control unit 8 is connected via a plug connection 9 to a central control means 10 of the motor vehicle 1 or of the motor vehicle door locking system 2.

A first actuating means 11 and a second actuating means 12 are assigned to the motor vehicle door lock 3 and can be directly connected electrically to the motor vehicle door lock 3 or its control unit 8 as illustrated in FIG. 2, as is indicated by the dashed lines 13. But, the actuating means 11, 12 can also be alternatively connected to the control means 10. In any case, the actuating means 11, 12 are used for electrical triggering of the assigned motor vehicle door lock 3.

In the illustrated example, the actuating means 11, 12 are assigned to an inside door handle 14, (e.g., are located on it and/or integrated into it, as indicated in FIG. 2). Other aspects of the inside door handle 14, provided in accordance with the invention, and of the motor vehicle door locking system 2 are detailed below using the enlarged schematic of the inside door handle 14 as shown in FIG. 3.

Figure 3:
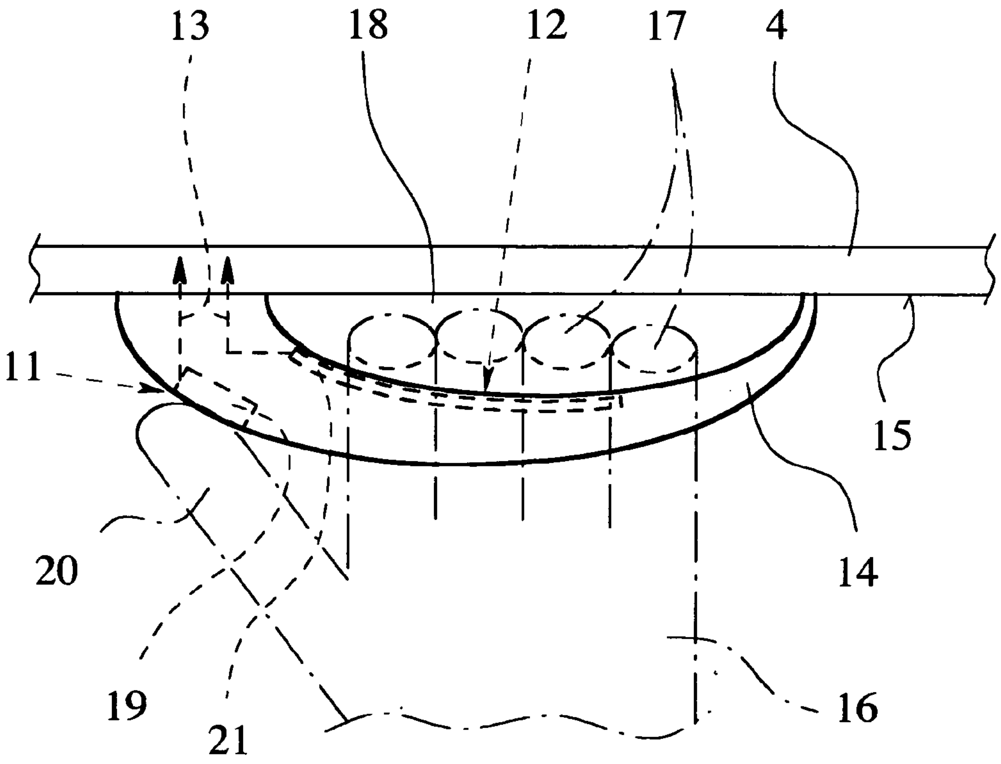
FIG. 3 shows a schematic perspective of an inside door handle in accordance with the invention.

The inside door handle 14 is located on the inside 15 of the door on the assigned motor vehicle door 4 which is shown schematically and only in extracts in FIG. 3.

In FIG. 3, a hand 16 with fingers 17 of an operator (who is not shown) is indicated by the dot-dash line. The hand 16 is shown at least partially reaching around the inside door handle 14 and reaching with the fingers 17 in the inner area 18 of the inside door handle 14. In the illustrated example the first actuating means 11 is made preferably as a pushbutton 19 which can be actuated, for example, by means of a thumb 20 of the hand 16, as is indicated in FIG. 3.

The second actuating means 12 in the illustrated example has a sensor 21 which can detect the approach and/or the touch of the hand 16 or fingers 17, especially the fingers 17 reaching into the interior 18 and/or reaching around the inside door handle 14. The sensor 21 can work capacitively. However, it should also be understood that the sensor 21 can also work, for example, inductively, piezoelectrically or optically.

The sensor 21 can be made as a switch or can be evaluated by switching so that actuation can be detected. There is actuation especially when the hand 16 or the fingers 17 encompass or touch the inside door handle 14 and/or reach into the interior 18 at least in areas and/or partially. The corresponding evaluation of the detected signals is possible within the second actuating means 12, in the sensor 21, in the inside door handle 14, in the control unit 8 and/or in the control means 10. The corresponding also applies to the first actuating means 11.

If necessary, the sensor 21 can be made as a proximity switch and/or a touch-sensitive switch. Instead of the sensor 21, a pushbutton 19 or other suitable switching means or the like can also be used for the second actuating means 12.

With regard to the first actuating means 11, instead of employing a pushbutton 19, a sensor 21 or other suitable switching means or the like can be used.

Only when simultaneous actuation (e.g., actuation overlapping in time) of the two actuating means 11, 12 takes place or is detected, the assigned motor vehicle door lock 3 unlocks or opens. This can take place by the corresponding wiring of the actuating means 11, 12 and/or the corresponding evaluation of the actuating signals which have been output by the actuating means 11, 12 (e.g., in the control unit 8 and/or the control means 10). If necessary this evaluation can also be integrated into the inside door handle 14. In this situation, the inside door handle 14 is "intelligent".

In addition to the requirement for simultaneous actuation of the two actuating means 11, 12, it can be provided that the actuation of the second actuating means 12 (i.e., reaching into the inside door handle 14 or its interior 18) must take place first, and only upon subsequent actuation of the first actuating means 11 (i.e., actuation of the pushbutton 19 with the thumb 20) unlocking or opening of the assigned motor vehicle door lock 3 takes place or is enabled.

Of course, the unlocking or opening of the motor vehicle door lock 3, which takes place when the two actuating means 11, 12 are actuated, can be overridden by a child safety lock or the like so that then unlocking or opening of the motor vehicle door lock does not take place.

Opening of the motor vehicle door lock 3 or of the motor vehicle door 4 by unintentional actuation of the opening pushbutton 19 or the like is prevented, since there are two actuating means 11, 12 and they are used and configured or evaluated such that the motor vehicle door lock 3 only unlocks or opens when the two actuating means 11, 12 are actuated at the same time. By the corresponding arrangement of the actuating means 11, 12, the simultaneous actuation requires at least partially encompassing the inside door handle 14 or reaching into the interior 18 which is encompassed by the inside door handle 14 or which is at least partially separated from it.

If necessary, the two actuating means 11, 12 can each have a pushbutton 19 and/or a sensor 21 and/or a suitable switch or the like. Preferably, the first actuating means 11 which is located on the side of the inside door handle 14 pointing towards the vehicle interior or on the top of the inside door handle 14 or which is integrated into it is made such that mechanical actuation (e.g., pushbutton 19) or deformation (e.g., a relatively powerful mechanical action) by the operator is necessary for actuation.

Conversely, the second actuating means 12 is preferably located on the side of the inside door handle 14 facing away or facing towards the interior 18 which is partially limited by the inside door handle 14 or on the bottom of the inside door handle 14 or is integrated into it and made such that approaching or touching (e.g., mechanical action of the operator) is sufficient as actuation. Thus, on the one hand, the desired security against unwanted unlocking or opening of the motor vehicle door 3, and on the other hand, simple operation are enabled, since the operator need focus solely on active actuation of the first actuating means 11.

The embodiments of the present invention can also be used fundamentally in an outside door handle or in other manipulation elements.

In addition or alternatively to the described electrical or electronic combination or evaluation of actuating signals from the two actuating means 11 and 12, the second actuating means 12 can also act mechanically on the first actuating means 11, for example, as a mechanical blocking device.

Figure 4:
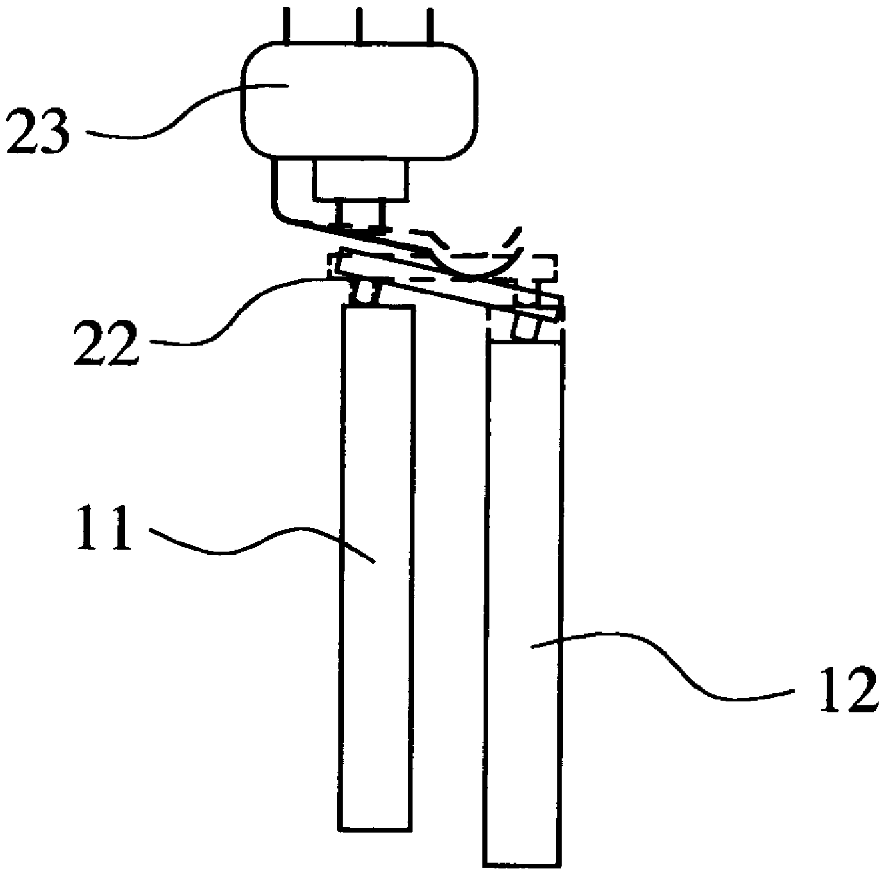
FIG. 4 shows a schematic perspective of a mechanical coupling between first and second actuation means in accordance with the invention.

FIG. 4 shows a rough schematic perspective of a preferred embodiment for such a mechanical coupling between the first actuation means 11 and the second actuation means 12 in accordance with the invention. Only when both actuation means 11, 12 are actuated, which in FIG. 4 would be the second actuation means 12 being moved upwards to the same level of the first actuation means 11, can the motor vehicle door lock 3 be unlocked or opened. In this situation, the bar 22 is in a leveled position and actuates switch 23, which is correspondingly assigned to the motor vehicle door lock 3.

According to an exemplary embodiment of the invention, the motor vehicle door locking system 2 is equipped with a passive entry function for unlocking the motor vehicle door lock 3. This has already been explained in the above. Upon unlocking by means of the passive entry function, in succession, a starting interval, an authentication check interval and an action interval are traversed. The starting interval is now preferably started by actuating at least one of the two actuating means 11, 12.

An especially compact arrangement can be achieved in that the actuation of the first actuating means 11 starts the starting interval and that the actuation of the second actuating means 12 causes opening of the motor vehicle door lock 3 if the action interval, therefore unlocking of the motor vehicle door lock 3, is completed.

In one exemplary embodiment of a motor vehicle door locking system 2 which is equipped with the passive entry function, the first actuating means 11, by which the starting interval can be started, is made as a proximity switch. Thus, this insures that the starting interval and the following intervals have already been traversed before the operator actuates the second actuating means 12. The second actuating means 12 is made here preferably as a pushbutton.

It is especially advantageous and practical when the first actuating means 11 is located on the side which faces away from the motor vehicle door 4 so that the approach of the operator can be detected early.

With respect to other advantageous configurations of the outside door handle in a motor vehicle door locking system 2 which is equipped with the passive entry function, reference should be made to the statements above.

What is claimed is:

1. A motor vehicle door locking system comprising:

at least one electrically triggered motor vehicle door lock;

a first actuating means associated with the motor vehicle door lock for triggering an unlocking or opening of the motor vehicle door lock; and a second actuating means associated with the motor vehicle door lock, wherein the motor vehicle door lock can be unlocked or opened only with simultaneous or successive actuation of the two actuating means.

2. Motor vehicle door locking system as claimed in claim 1, wherein at least one of the first and the second actuating means is responsive to approaching or touching of a part of an operator's body or a deformation of the actuating means for detecting and evaluating actuation of the locking system.

3. Motor vehicle door locking system as claimed in claim 1, wherein at least one of the first and the second actuating means is a pushbutton.

4. Motor vehicle door locking system as claimed in claim 1, wherein at least one of the first and the second actuating means is a switching or a non-switching sensor.

5. Motor vehicle door locking system as claimed in claim 4, wherein the sensor is a proximity switch or a momentary-contact switch.

6. Motor vehicle door locking system as claimed in claim 4, wherein the sensor is one of an inductively, capacitively, piezoelectrically and optically working sensor.

7. Motor vehicle door locking system as claimed in claim 1, wherein the first actuating means is a pushbutton and the second actuating means is a sensor.

8. Motor vehicle door locking system as claimed in claim 7, wherein the motor vehicle door lock is unlockable or openable by actuation of the pushbutton only when the sensor detects the approach or touching of a part of an operator's body or a deformation before detection of actuation of the pushbutton.

9. Motor vehicle door locking system as claimed in claim 1, wherein at least the detection areas of the first and the second actuating means are located spaced apart from one another on a door handle of a motor vehicle with which the motor vehicle door lock is associated.

10. Motor vehicle door locking system as claimed in claim 1, wherein either of the first or the second actuating means is located on a door handle or on a motor vehicle door which the motor vehicle door lock is associated.

11. Motor vehicle door locking system as claimed in claim 1, wherein either of the first or the second actuating means is located on an inside door handle.

12. Motor vehicle door locking system as claimed in claim 1, wherein the motor vehicle door lock has a control unit for at least one of detection and evaluation of signals associated with actuation of at least one of the first and second actuating means.

13. Motor vehicle door locking system as claimed in claim 12, wherein the motor vehicle door lock has an actuator and wherein the control unit is adapted for triggering said actuator.

14. Motor vehicle door locking system as claimed in claim 1, further comprising a central control means for at least one of detection and evaluation signals associated with actuation of at least one of the first and second actuating means.

15. Motor vehicle door locking system as claimed in claim 12, wherein the control unit is adapted for evaluating whether actuation of the first and the second actuating means is taking place simultaneously or in succession, and outputting an unlocking or opening signal to the motor vehicle door lock or an actuator of the motor vehicle door lock based on said evaluation.

16. Motor vehicle door locking system as claimed in claim 14, wherein the central control unit is adapted for evaluating whether actuation of the first and the second actuating means is taking place simultaneously or in succession, and outputting an unlocking or opening signal to the motor vehicle door lock or an actuator of the motor vehicle door lock based on said evaluation.

17. Motor vehicle door locking system as claimed in claim 1, wherein the second actuating means acts mechanically on the first actuating means such that the motor vehicle door lock can be unlocked or opened only with simultaneous or successive actuation of both actuating means.

18. Motor vehicle door locking system as claimed in claim 1, wherein the motor vehicle door locking system further includes a passive entry function for unlocking the motor vehicle door lock, wherein upon unlocking by means of the passive entry function, in succession, a starting interval, an authentication check interval and an action interval are traversed, and wherein actuating at least one of the actuating means starts the starting interval.

19. Motor vehicle door locking system as claimed in claim 18, wherein the actuation of the first actuating means starts the starting interval and wherein the actuation of the second actuating means causes opening of the motor vehicle door lock provided that the action interval is completed.

20. Motor vehicle door locking system as claimed in claim 18, wherein at least one of the first and the second actuating means is a pushbutton.

21. Motor vehicle door locking system as claimed in claim 18, wherein at least one of the first and the second actuating means is a switching or a non-switching sensor.

22. Motor vehicle door locking system as claimed in claim 21, wherein the sensor is a proximity switch or momentary-contact switch.

23. Motor vehicle door locking system as claimed in claim 21, wherein the sensor is one of an inductively, capacitively, piezoelectrically or optically working sensor.

24. Motor vehicle door locking system as claimed in claim 19, wherein the first actuating means is a proximity switch and wherein the second actuating means is a pushbutton.

25. Motor vehicle door locking system as claimed in claim 19, wherein at least the detection areas of the first and the second actuating means are spaced apart from one another on a door handle of the motor vehicle door with which the motor vehicle door lock is associated.

26. Motor vehicle door locking system as claimed in claim 25, wherein the first actuating means is located on a side of the door handle facing away from the motor vehicle door.

27. Motor vehicle door locking system as claimed in claim 18, wherein a central control means is provided for executing the passive entry function.

28. Door handle for a motor vehicle door comprising:

a first actuating means for unlocking or opening of the motor vehicle door lock, wherein actuation of the first actuating means is electrically detectable; and a second actuating means which is coupled to the first actuating means such that the motor vehicle door lock is unlocked or opened only with simultaneous or successive actuation of the first and second actuating means.

29. Door handle as claimed in claim 28, wherein the second actuation means is electrically coupled—wired—to the first actuating means such that the motor vehicle door lock is unlocked or opened only with simultaneous or successive actuation of the first and second actuating means.

30. Door handle as claimed in claim 28, wherein the second actuation means is mechanically coupled to the first actuating means such that the motor vehicle door lock is unlocked or opened only with simultaneous or successive actuation of the first and second actuating means.

31. Door handle as claimed in claim 28, wherein the door handle is an inside door handle for a motor vehicle door.

32. Door handle as claimed in claim 28, wherein at least one of the first and second actuating means is responsive to the approach of or touching by a part of an operator's body or a deformation for detecting and evaluating actuation of the actuating means.

33. Door handle as claimed in claim 28, wherein at least one of the first and the second actuating means is a pushbutton.

34. Door handle as claimed in claim 28, wherein at least one of the first and the second actuating means is a switching or a non-switching sensor.

35. Door handle as claimed in claim 34, wherein the sensor is a proximity switch or momentary-contact switch.

36. Door handle as claimed in claim 34, wherein the sensor is one of an inductively, capacitively, piezoelectrically or optically working sensor.

37. Door handle as claimed in claim 28, wherein the first actuating means is a pushbutton and the second actuating means is a sensor.

38. Door handle as claimed in claim 37, wherein the motor vehicle door lock is unlockable or openable by actuation of the pushbutton only when the sensor detects the approach or touching of a part of an operator's body or a deformation before detection of actuation of the pushbutton.

39. Door handle as claimed in claim 37, wherein the pushbutton is located on a side of the door handle facing away from the motor vehicle door and the sensor is located on a side of the door handle facing toward the motor vehicle door or an interior space which is at least partially surrounded by the door handle.

40. Door handle as claimed in claim 28, wherein at least detection areas of the first and the second actuating means are located spaced apart from one another.

* * * * *